(12) United States Patent
Takeuchi

(10) Patent No.: US 8,363,748 B2
(45) Date of Patent: Jan. 29, 2013

(54) TWO-WAY COMMUNICATION CIRCUIT, TWO-WAY COMMUNICATION SYSTEM, AND COMMUNICATION METHOD OF TWO-WAY COMMUNICATION CIRCUIT

(75) Inventor: Junichi Takeuchi, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 578 days.

(21) Appl. No.: 11/987,532

(22) Filed: Nov. 30, 2007

(65) Prior Publication Data
US 2008/0152024 A1 Jun. 26, 2008

(30) Foreign Application Priority Data
Dec. 1, 2006 (JP) ................................ 2006-326106

(51) Int. Cl.
*H04L 27/00* (2006.01)

(52) U.S. Cl. .................................... 375/295; 375/296

(58) Field of Classification Search .................. 375/295
See application file for complete search history.

(56) References Cited

U.S. PATENT DOCUMENTS

| 3,208,049 A | 9/1965 | Doty, Sr. et al. |
| 5,530,894 A * | 6/1996 | Farrell et al. ................. 709/250 |
| 5,623,611 A | 4/1997 | Matsukawa et al. |
| 5,864,544 A | 1/1999 | Serinken et al. |
| 6,247,060 B1 * | 6/2001 | Boucher et al. ............... 709/238 |
| 6,728,309 B1 * | 4/2004 | Turner ......................... 375/222 |
| 7,633,965 B2 * | 12/2009 | Shibata et al. ................ 370/463 |
| 7,636,556 B2 * | 12/2009 | Carballo et al. ............ 455/127.5 |
| 7,706,309 B2 * | 4/2010 | Shibata et al. ................ 370/282 |
| 7,787,896 B2 * | 8/2010 | Kundu et al. .................. 455/518 |
| 2003/0142693 A1 * | 7/2003 | Umayabashi et al. ........ 370/476 |
| 2005/0080935 A1 * | 4/2005 | Fukae et al. ...................... 710/1 |
| 2005/0201162 A1 * | 9/2005 | Shibata et al. ........... 365/189.05 |
| 2005/0201305 A1 * | 9/2005 | Shibata et al. ................ 370/282 |
| 2005/0201411 A1 * | 9/2005 | Shibata et al. ................ 370/463 |
| 2006/0183424 A1 * | 8/2006 | Linde ........................... 455/41.2 |

FOREIGN PATENT DOCUMENTS

| DE | 1 286 072 A | 8/1961 |
| DE | 1 762 425 A | 6/1968 |
| JP | 61-169037 | 7/1986 |
| JP | 9-98200 | 4/1997 |
| JP | 2005-260361 | 9/2005 |

OTHER PUBLICATIONS

German Office Action dated Oct. 11, 2011.
Notification of Reasons for Rejection dated Nov. 22, 2011 (with an English translation).
German Office Action dated Jul. 26, 2012 with English language translation.

* cited by examiner

*Primary Examiner* — David Ometz
*Assistant Examiner* — Santiago Garcia
(74) *Attorney, Agent, or Firm* — McGinn IP Law Group, PLLC

(57) ABSTRACT

A two-way communication circuit is connected to one end of a cable performing half-duplex communication. The two-way communication circuit includes a controller register storing a control signal including switch indication information switching a transmission direction and a reception direction; a communication controller managing timing depending on the control signal stored in the controller register; and a transmission and reception circuit periodically switching the transmission direction and the reception direction according to an indication by the communication controller depending on the control signal.

18 Claims, 13 Drawing Sheets

TWO-WAY COMMUNICATION CIRCUIT, TWO-WAY COMMUNICATION SYSTEM, AND COMMUNICATION METHOD OF TWO-WAY COMMUNICATION CIRCUIT

BACKGROUND OF THE INVENTION

1. Field of the Invention

The present invention relates to a two-way communication circuit, a two-way communication system, and a communication method of the two-way communication circuit that are suitable for IEEE 1394 or HDMI (High Definition Multimedia Interface) or the like for example, which are network and interface technology applied to digital products such as PC, digital appliance, and in-vehicle video device.

2. Description of Related Art

Digitization of video application has recently been accelerated and digitization of transmission path physically transmitting video has also been digitalized. IEEE 1394 and HDMI and the like are employed as digital interface technologies, and Ethernet and the like are employed as a network technology. It has now been discovered that transfer efficiency is not maximized in these systems due to arbitration signal for data transmission, retransmission, idle period between data or the like.

As shown in FIG. 10, in a typical ping-pong transmission, transmission and reception are alternately repeated and information is exchanged by one transmission path or a pair of transmission paths. Note that the ratio of transmission to reception is one to one.

On the other hand, in a ping-pong transmission method disclosed in Japanese Unexamined Patent Application Publication No. 09-098200 (Iinuma), ratio of transmitting to receiving can be changed by performing continuous receiving or transmitting. In this ping-pong transmission method, transmission or reception is kept when a start bit is 1. Transmission and reception are changed when the start bit is 0. FIG. 11 shows a data transmission method disclosed in Iinuma. In FIG. 11, transmission and reception are switched by setting the start bit of second transmission, fourth transmission, and seventh transmission to 0. In other transmissions, transmission or reception is kept by setting the start bit to 1.

In a data transfer control device disclosed in Japanese Unexamined Patent Application Publication No. 2005-260361 (Shibata et al.), a host-side device transmits a transfer direction request code after packet data and a target-side device detects the transfer direction request code, thereby making it possible to switch between a transmission direction and a reception direction. In other words, the data transfer control device includes a transmitter circuit which transmits data through a serial signal line and a receiver circuit which receives data through the serial signal line. The data transfer control device further includes a transfer direction switch circuit which performs switching between the transmission direction and the reception direction, and a transfer direction switch indication circuit which indicates the transfer direction switch circuit to switch the transfer direction. The data transfer control device further includes a code generation circuit which generates a transfer direction switch request code when the transfer direction switch request has been received from a higher-order layer circuit. When the transfer direction switch request has been received from the upper layer circuit, the transmitter circuit transmits the transfer direction switch request code through the serial signal line, and the transfer direction switch indication circuit indicates the transfer direction switch circuit to switch the transfer direction from the transmission direction to the reception direction after the transfer direction switch request code has been transmitted. By having such a structure, it is possible to prevent two transmitter circuits being connected to the serial signal line when the transfer direction is switched.

Further, Japanese Unexamined Patent Application Publication No. 61-169037 (Imokawa) discloses the following method. In a two-way serial data transmission method between a master logic circuit and a slave logic circuit to which the same clock signal are given, both of the master logic circuit and the slave logic circuit being in the same device, header indicating transfer direction control pattern as well as synchronization information are inserted to the serial data transmitted from the master logic circuit to the slave logic circuit. When the slave logic circuit detects the header indicating the direction control pattern, the slave logic circuit switches from a reception mode to a transmission mode for a certain period of time, and the slave circuit performs transmission in the reverse direction. Therefore, data transmission can be performed by one signal line except the clock line.

However, according to the method disclosed in Iinuma, as shown in FIG. 12, when transmission unit is large, there are areas where data is not transmitted. Therefore, full bandwidth is not used at all times. In FIG. 12, thick line shows data that is actually transmitted or received. However, it can be seen that full bandwidth is not used at all times and there are some area that is not used for transmission or reception of data because only a part of slot of transmission and reception is used.

On the other hand, when transmission unit is small, influence of bit indicating switching of transmission and reception becomes large, which causes decreasing of transmission efficiency. In FIG. 13, the ratio of the start bit to the whole is large because the transmission unit is small.

As stated above, although continuous transmission or continuous reception is possible, transmission time or reception time per one burst is constant and the same burst time is spent even when an amount of transmission data or reception data is small, which causes wasting of time. Further, a bit for switching transmission is added to start bit of each transmission data. Therefore, it causes a problem that the ratio of bit for switching to the whole transmission data becomes large when the transmission unit is small and transfer efficiency degrades.

In application systems, functions that are required are different between systems. For example, a display device such as display or monitor does not need to control a main body such as TV or PC (personal computer) in a display system such as connecting the PC and the monitor or connecting a digital TV and a tuner, for example. However, two-way communication is required in in-vehicle LAN (local area network), for example, where it is assumed that a car navigation and a camera video process unit cooperate with each other to realize one application. In such a case, the slave (target device) also needs to obtain a transmission right.

However, we have now discovered that the above-described techniques have problems below. For example, in the technique disclosed in Iinuma, the host controls switching of transmission and reception, and the slave cannot control the switching of transmission and reception. Further, in the data transfer control device disclosed in Shibata et al., the target cannot obtain the transmission right by itself. Therefore, this technique is not suitable for the application in which transfer direction is needed to be controlled by both of the host and the target. Further, in the two-way serial data transfer method disclosed in Imokawa, only the master side transmits the transmission direction control pattern and the slave side cannot obtain the transmission right. Transmission time from the slave to the master is fixed and the slave cannot arbitrary set or change transmission time by itself.

SUMMARY

According to one aspect of the present invention, there is provided a two-way communication circuit connected to one end of a cable performing half-duplex communication, including: a controller register storing a control signal including switch indication information switching a transmission direction and a reception direction; a communication controller managing timing depending on the control signal stored in the controller register; and a transmission and reception circuit periodically switching the transmission direction and the reception direction according to an indication by the communication controller depending on the control signal.

According to another aspect of the present invention, there is provided a two-way communication system including two-way communication circuits, each of which being connected to each end of a cable performing half-duplex communication, in which at least one of the two-way communication circuits including: a controller register storing a control signal including switch indication information switching a transmission direction and a reception direction; a communication controller managing timing depending on the control signal stored in the controller register; and a transmission and reception circuit periodically switching the transmission direction and the reception direction according to an indication by the communication controller depending on the control signal.

According to the present invention, both devices connected to the cable periodically switch the transmission direction and the reception direction by periodically transferring the control signal including switch indication information switching the transmission direction and the reception direction. Therefore, it is possible for both devices to obtain transmission right. In other words, according to the present invention, there is provided a two-way communication circuit, a two-way communication system, and a transmission method of the two-way communication circuit that are capable of improving transmission efficiency.

BRIEF DESCRIPTION OF THE DRAWINGS

The above and other objects, advantages and features of the present invention will be more apparent from the following description of certain preferred embodiments taken in conjunction with the accompanying drawings, in which.

DETAILED DESCRIPTION OF THE PREFERRED EMBODIMENTS

The invention will now be described herein with reference to illustrative embodiments. Those skilled in the art will recognize that many alternative embodiments can be accomplished using the teachings of the present invention and that the invention is not limited to the embodiments illustrated for explanatory purposes.

First Embodiment

Figure 1:
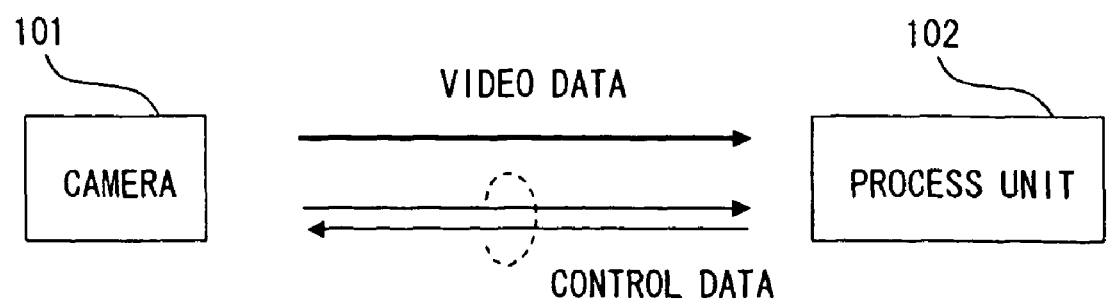
FIG. 1 is a diagram showing a camera data process system according to an embodiment of the present invention.

The specific embodiment to which the present invention is applied will now be described in detail with reference to the drawings. As stated above, a car navigation and a camera video process unit cooperate with each other to realize one application, for example, a slave (target device) also needs to obtain a transmission right. The summary of the present embodiment will be described by taking an example of a camera data process system. FIG. 1 is a diagram showing the camera data process system. The camera data process system can be realized by transferring data interactively between a camera 101 and a process unit 102. In this case, it is preferable that data transfer bandwidth used to transfer data from the camera 101 to the process unit 102 is wide enough to achieve high transfer efficiency. In the present embodiment, control signals including switch indication information switching a transmission direction and a reception direction are periodically transferred to switch the transmission direction and the reception direction. In the description below, data of the application such as video data from the camera is called process data for the purpose of distinguishing the control signal from the process data.

Figure 2:
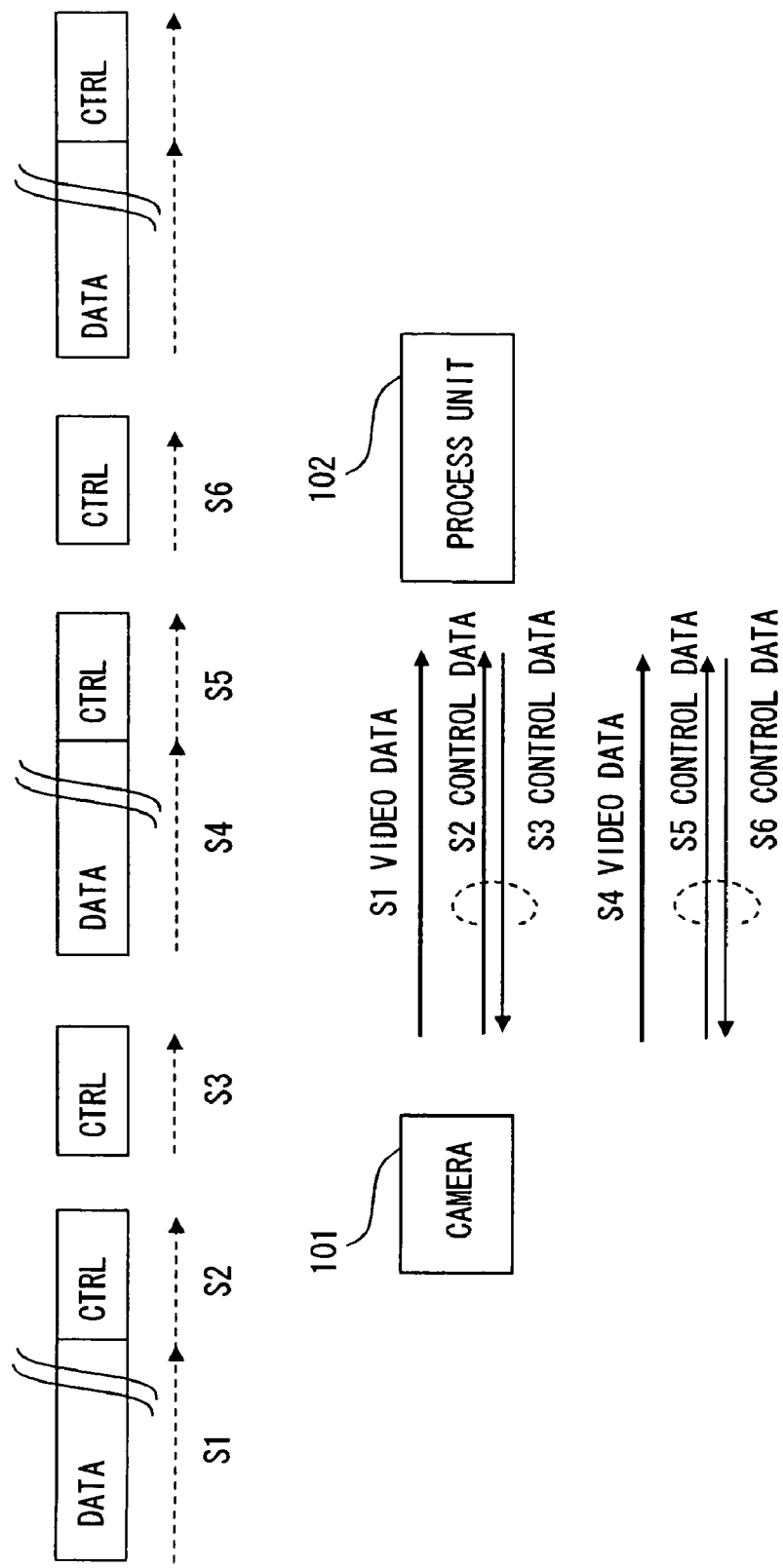
FIG. 2 is a diagram showing a process of transmission and reception in the camera data process system according to the embodiment of the present invention.

FIG. 2 is a diagram showing a process of transmission and reception in the camera data process system according to the embodiment of the present invention. As shown in FIG. 2, video data (process data) DATA is transmitted from the camera 101 to the process unit 102 (S1). Then the control signal which also functions as a switch signal is transmitted to the process unit 102 (S2). By this transmission, the transmission right is transferred to the process unit 102 and the control signal is transmitted to the camera (S3). Then the transmission is switched by reception of the control signal because the control signal includes switch indication information for switching the transmission direction and the reception direction. The transmission right is transferred to the camera 101 and the video data is transmitted (S4). Then the video data and the control signal are transmitted in the same way as in (S2) and (S3).

In the present embodiment, the control signal (CTRL) which functions as the switch signal is periodically transferred between the camera 101 which is the target and the process unit 102 which is the master device (also called host device), thereby making it possible for the camera 101 which is the target device to constantly obtain the transmission right. As stated below, the control signal includes an indication for switching the transmission direction and the reception direction (switch indication information). Therefore, it is possible even for the target to obtain the transmission right and perform transmission by periodically transferring the control signal between the target and the master.

Figure 3:
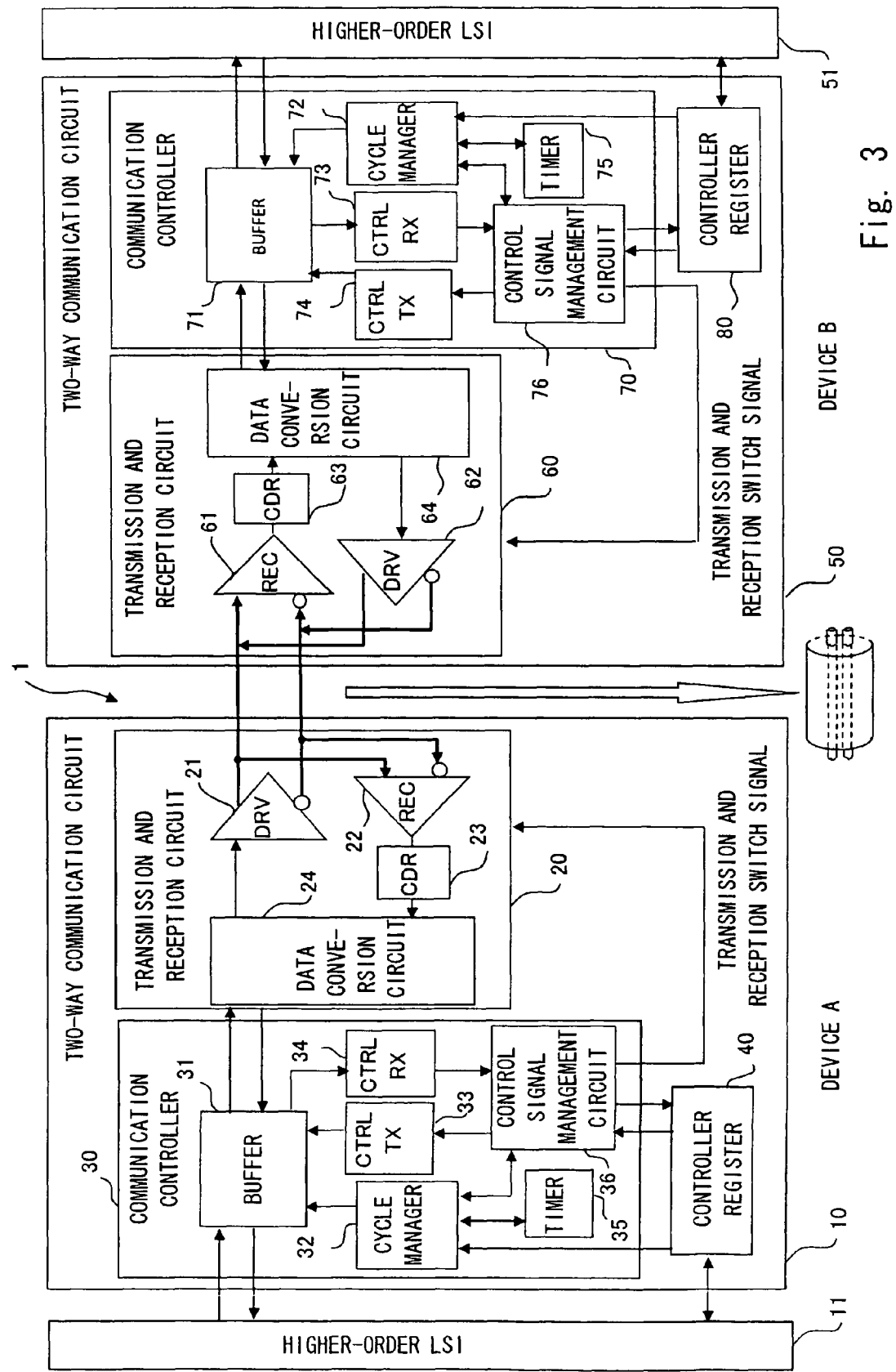
FIG. 3 is a diagram showing a two-way communication system according to a first embodiment of the present invention.
Figure 4:
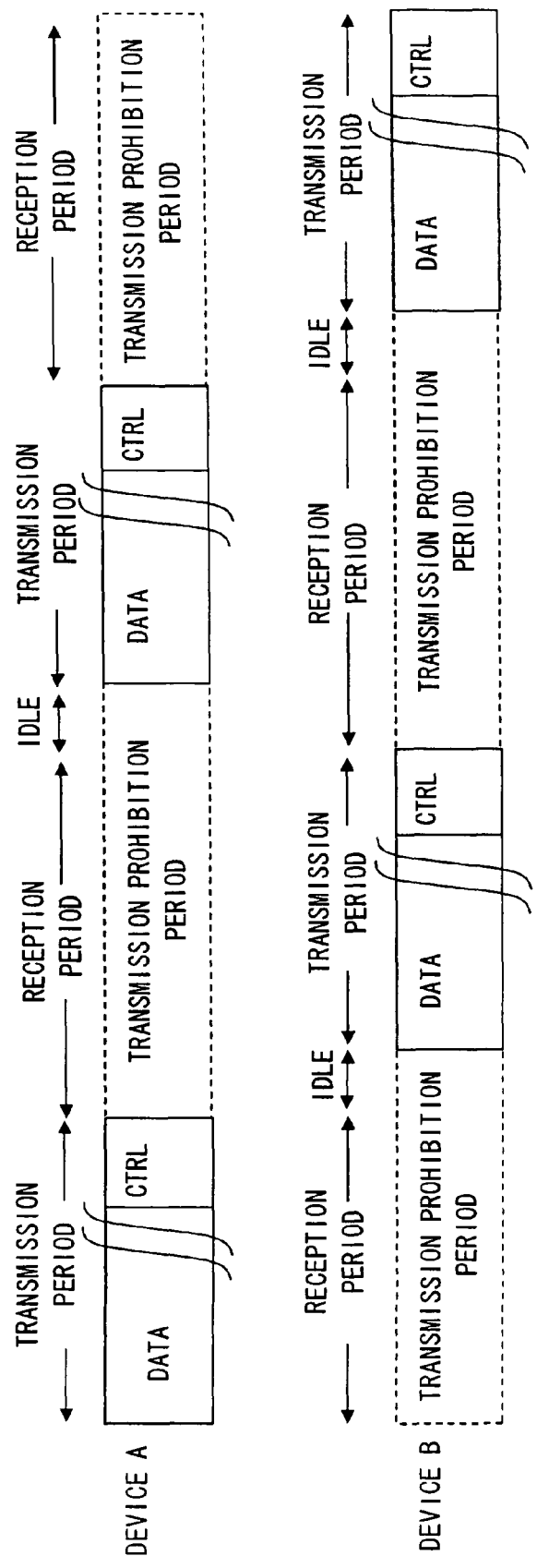
FIG. 4 is a diagram showing a timing of transmission and reception of the two-way communication system according to the first embodiment of the present invention.

Now, the two-way communication circuit according to the present embodiment is described in detail. FIG. 3 is a diagram showing a two-way communication system according to the present embodiment. FIG. 4 is a diagram showing a timing of transmission and reception for data communication. The upper diagram in FIG. 4 shows a mechanism for switching transmission and reception of the device A in FIG. 3, and the lower diagram in FIG. 4 shows a mechanism for switching transmission and reception of the device B in FIG. 3.

In a transmission and reception system 1, the device A and the device B are connected to each other by one cable or a pair of cables. The cable may be half-duplex type or full-duplex type. In full-duplex type, data can be transmitted and received simultaneously in two directions. However, it is effective to achieve half-duplex communication in the area where the cost reduction is strongly required.

In the present embodiment, the device A and the device B have the same structure. The device A will be described in this specification. As stated below, the device A and the device B may have different structures.

The device A includes a higher-order LSI (Large Scale Integrated circuit) such as a processor implementing application (also called as application circuit) 11 and a two-way communication circuit 10. The two-way communication circuit 10 is the circuit realizing data communication in half-duplex mode and includes a communication controller 30, a controller register (CTRL register) 40, and a transmission and reception circuit 20. Note that the CTRL register 40 can be provided in the communication controller 30.

The communication controller 30 includes a buffer circuit (buffer) 31, a cycle management circuit (cycle manager) 32, a timer circuit (timer) 35, a control signal management circuit (CTRL manager) 36, a control signal transmission circuit (CTRL TX) 33, and a control signal reception circuit (CTRL RX) 34.

The buffer 31 temporarily stores the transmission and reception data. The cycle manager 32 controls the timing of communication. The timer 35 is a reference timer accessed by the cycle manager 32 to refer to time passage. The CTRL manager 36 manages writing to and reading from the CTRL register 40 and inputs and outputs the control signal (CTRL) to and from the transmission and reception circuit 20 according to a timing designated by the cycle manager. The CTRL TX 33 transmits the control signal. The CTRL RX 34 receives the control signal (CTRL).

When the control signal (CTRL) is transmitted, the CTRL manager 36 retrieves a value from the CTRL register 40 and the control signal (CTRL) retrieved from the CTRL register 40 is passed to the buffer 31 according to a timing designated by the cycle manager 32. The control signal is periodically retrieved from the CTRL register 40 by the cycle manager 32 and the retrieved control signal is transmitted to the buffer 31.

When the control signal (CTRL) is received, the CTRL manager 36 detects and retrieves the control signal (CTRL) from the buffer 31 under a control of the cycle manager 32, and then stores the control signal (CTRL) in the CTRL register 40. Note that the CTRL TX 33 and the CTRL RX 34 may be provided in the CTRL manager 36.

The CTRL register 40 is the register storing the control signal (CTRL) of transmission timing shown in FIG. 4. The control signal (CTRL) from the opposing device (device B is the opposing device against the device A) is written into the CTRL register 40 through the buffer 31, the CTRL RX 34, and the CTRL manager 36. The CTRL register 40 can also be accessed by the higher-order LSI 11, and the control signal (CTRL) is written into the CTRL register 40 according to the request from the higher-order LSI 11. The control signal (CTRL) transmitted from the opposing device is notified to the higher-order LSI 11.

The transmission and reception circuit 20 includes a transmission circuit (DRV) 21, a receiver circuit (REC) 22, a clock data recovery circuit (CDR) 23, and a data conversion circuit 24. The transmission circuit 21 transmits data. The receiver circuit 22 receives data. The CDR 23 generates a clock for sampling input serial data. The data conversion circuit 24 includes a parallel-serial converter (P/S) converting parallel data to serial data when data is transmitted, and a serial-parallel conversion circuit (S/P) converting serial data to parallel data when data is received.

The transmission and reception circuit 20 can switch a transmission mode and a reception mode. In the transmission mode, the receiver circuit 22 is deactivated and the transmission circuit 21 outputs the serialized signal. In the reception mode, the transmission circuit 21 is not used and the receiver circuit 22 is activated. In the reception mode, electric current is not passed through the cable and the receiver circuit 22 is in a high-impedance state.

Now, a behavior of the two-way communication system according to the present embodiment will be described.
(1) Data Communication
(2) Setting Master and Target
(3) Timing of Transmission and Reception
(4) Control Signal
will be described in this order.
(1) Data Communication The communication controller 30 transmits transmission data (process data) transmitted from the higher-order LSI 11 to the transmission and reception circuit 20 during a transmission period in the device A. After the data is transmitted, the communication controller 30 adds the control signal (CTRL) to the process data and transmits the data with CTRL. As stated above, the control signal (CTRL) includes switch indication information of the transmission and reception mode. The process data to which the control signal is added is transmitted from the buffer 31 to the data conversion circuit 24 in the transmission and reception circuit 20, where the process data is converted into a serial data. Then the converted data is transmitted to a transmission line by the transmission circuit (DRV) 21. After the transmission of the control signal is completed, the communication controller 30 deactivates the transmission circuit DRV 21 and activates the receiver circuit REC 22. Then the transmission and reception circuit 20 is switched from the transmission mode to the reception mode.

The device B which has detected the control signal (CTRL) is switched from the reception mode to the transmission mode. Now the device B obtains the transmission right, which makes it possible for the device B to transmit the process data and the control signal to the device A. More specifically, the process data and the control signal (CTRL) which reached the device B are received by a reception circuit (REC) 61 in a transmission and reception circuit 60 and are input to a clock data recovery circuit (CDR) 63, where a clock for sampling the input serial data is generated. Further, the process data is converted from the serial data to the parallel data by a data conversion circuit 64. After that, the data is temporarily stored in a buffer 71 in a communication controller 70. Then the data is input to a CTRL RX 73 from the buffer 71 and the control signal (CTRL) is detected. The detected control signal is registered in a CTRL register 80 by a CTRL manager 76. By doing this process, the control signal can be read out from a higher-order LSI 51.

When the control signal (CTRL) is detected, the transmission and reception circuit is set to the transmission mode by the CTRL manager 76 after a pre-determined IDLE period. The transmission period, the reception period, and the IDLE period are registered in the CTRL register 80. The cycle manager 72 reads out the value of the CTRL register 80, generates a signal indicating the transmission period, the reception period, and the IDLE period while referring to the timer value of the timer 75, and notifies the buffer 71 and the CTRL manager 76 of the timing.

The device B transmits the data transmitted from the higher-order LSI 51 and adds the control signal (CTRL) to the end of the data transmission. The control signal (CTRL) registered in the CTRL register 80 is read out by the CTRL manager 76. Then the control signal (CTRL) is input to the buffer 71 by using the CTRL TX 74 based on the timing indication by the cycle manager 72. Then as shown in FIG. 4, the control signal (CTRL) is added to the end of the data. When the transmission is completed, the transmission and reception circuit 60 is switched from the transmission mode to the reception mode by the CTRL manager 76. Then these procedures are repeated. By doing this process, the device A and the device B can periodically and alternately transfer the data in a pre-determined timing. By periodically transferring the data and the control signal (CTRL), it is possible to periodically transfer the transmission right between the device A and the device B, as will be described below. It does not matter which device is the master or which is the target.

As stated above, in the present invention, the control signal which is the switch signal switching the transmission direction and the reception direction is added to the end of the data transmission. Therefore, the transmission and reception are switched immediately after the data transmission is completed. The start bit is not used, unlike the related art, but the switch signal is added to the end of the packet. At this time, the control signal used in the application is allocated to the switch signal. Transmission and reception are timely switched. Therefore, there is no bandwidth that is not used, and application can efficiently use the physical transmission path. Further, the master device sets the transmission period, the reception period, and the IDLE period by the control signal, thereby making it possible to manage the transmission and reception period and the IDLE period in which no data is transferred.

(2) Setting Master and Target

After being powered on or being reset, the device A and the device B are set either to the master or to the target. There are no such cases that both devices become master or both devices become target. The master mainly manages the timing of transmission and reception and the target transmits a timing change request to the master as appropriate. The device having larger period, or having longer High interval and longer Low interval is set to the master. In other words, the master and the target are determined by setting this period.

The register determining this period can be prepared in the CTRL register 40 and the period can be set by the higher-order LSI 11. In other words, the device that desires to be the master sets the period accordingly.

Figure 5:
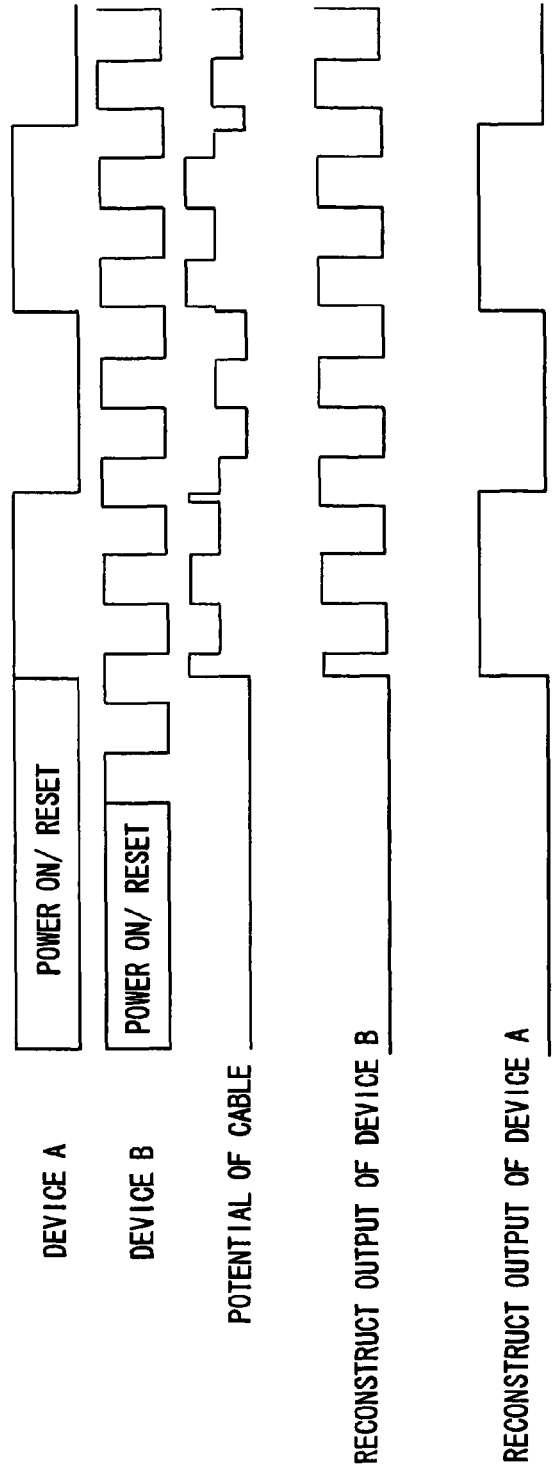
FIG. 5A is a diagram describing a method for setting a master and a slave according to the first embodiment of the present invention and showing a reconstructed waveform of an opposing device.
FIG. 5B is a diagram describing a method for setting a master and a slave according to the first embodiment of the present invention and showing a relationship among output of a device, potential of a cable, and output of the opposing device.

The determination whether the device is the master or the slave can be performed as follows. After being powered on, the device A and the device B repeat outputs of High interval (1) and Low interval (0) depending on the time that is previously set by each device. The levels transmitted from the device A and device B are combined and the potential of the cable is determined. As stated above, in the present embodiment, potential of the cable becomes the reconstruction waveform as shown in FIG. 5 because the transmission mode and the reception mode are switched. The potential of the cable becomes High when both devices transmit High level, and the potential of the cable becomes Low when both devices transmit Low level. The potential of the cable becomes Z which is the intermediate level between High and Low when both levels are different.

By monitoring this cable level (0, Z, 1) by the transmission and reception circuits 20 and 60, the output of the device B is reconstructed by the device A and the output of the device A is reconstructed by the device B as shown in FIG. 5A. This reconstruction can be carried out based on the table shown in FIG. 5B. The signal output by the opposing device is reconstructed based on the output from the device and the reception signal. For example, when the reception signal is Z (intermediate level between High and Low) while the device outputs "1 (High)", the opposing device may output "0 (Low)". In the same way, when the reception signal is Z while the device outputs "0 (Low)", the opposing device may output "1 (High)". Thus, the reconstruction waveform can be reconstructed. Then by comparing output cycle of the device and output cycle of the opposing device, the device having larger period can be determined as the master.

Note that the master determination process and the periodic data transfer process are separated with each other in the present embodiment. The data transfer starts after the master is determined. Therefore, the master determination process other than this process (IEEE 1394 (Institute of Electrical and Electronic Engineers 1394)) can be used.

(3) Timing of Transmission and Reception

The master device sets the timing of transmission and reception after the devices are powered on, after the devices are reset, before a series of packets are transferred, or during the packet is transferred. More specifically, the transmission period, the IDLE period, and the reception period of FIG. 4 are set. Note that the transmission period is the period for transmitting the data and the control signal (CTRL) and the reception period is the period in which the transmission is not performed. The IDLE period is the period in which neither transmission nor reception is performed.

This setting is performed by the master device based on the indication from the higher-order LSI of its device. The target device does not set the time because setting time simultaneously by both the master device and the target device causes mismatch of the setting or the like. In the present embodiment, the device A is described as the master and the device B is described as the target. Therefore, the device A sets the period. However, when the device B is the master, the device B can set the period.

The higher-order LSI 11 writes timing information to the CTRL register 40. The value of the CTRL (CTRL code) of timing notification from the higher-order LSI in table 1 below is written into the CTRL register 40. The cycle manager 32 manages the transmission period, the reception period, and the IDLE period according to the value of the CTRL register

40. The cycle manager 32 refers to the time of the timer 35 and notifies the buffer 31 and the CTRL manager 36 of time information. The buffer 31 and the CTRL manager 36 transmit the data and the control signal at the notified time. The CTRL manager 36 further transmits the transmission and reception switch signal to the transmission and reception circuit 20 to indicate switching of the transmission and reception. Consequently, the timing shown in FIG. 4 can be achieved.

described in (1), and the received control signal is written in the CTRL register 40 through the buffer 31, the CTRL RX 34, and the CTRL manager 36 in the master device. Subsequent management procedures are the same.

(4) Control Signal

A basic function of the control signal is to switch transmission and reception. However, the control signal also has a function to perform the timing change request from the opposing device, as described above. The data communica-

TABLE 1

| Classification | Contents | CTRL | Explanation |
|---|---|---|---|
| | No Message | 1010 0000 0001 | Only Switch Indication |
| Timing Notification from Higher-order LSI (Master) | Transmission Period | 1010 0001 0001 | 5 µs × 1 = 5 µs |
| | | 1010 0001 0010 | 5 µs × 2 = 10 µs |
| | | ... | ... |
| | | 1010 0001 1111 | 5 µs × 16 = 80 µs |
| | IDLE Period | 1010 0010 0001 | 100 ns × 1 = 100 ns |
| | | 1010 0010 0010 | 100 ns × 2 = 200 ns |
| | | ... | ... |
| | | 1010 0010 1111 | 100 ns × 16 = 1600 ns |
| | Reception Period | 1010 0011 0001 | 5 µs × 1 = 5 µs |
| | | 1010 0011 0010 | 5 µs × 2 = 10 µs |
| | | ... | ... |
| | | 1010 0011 1111 | 5 µs × 16 = 80 µs |
| Timing Change Request from Target | Transmission Period | 1010 0100 0001 | 5 µs × 1 = 5 µs |
| | | 1010 0100 0010 | 5 µs × 2 = 10 µs |
| | | ... | ... |
| | | 1010 0100 1111 | 5 µs × 16 = 80 µs |
| | IDLE Period | 1010 0101 0001 | 100 ns × 1 = 100 ns |
| | | 1010 0101 0010 | 100 ns × 2 = 200 ns |
| | | ... | ... |
| | | 1010 0101 1111 | 100 ns × 16 = 1600 ns |
| | Reception Period | 1010 0110 0001 | 5 µs × 1 = 5 µs |
| | | 1010 0110 0010 | 5 µs × 2 = 10 µs |
| | | ... | ... |
| | | 1010 0110 1111 | 5 µs × 16 = 80 µs |
| Application Control Indication and Notification from Higher-order LSI (Master/Target) | Camera Zoom Indication | 1010 0111 0001 | — |
| | Camera Resolution Setting | 1010 0111 0010 | — |
| | Camera Status Reporting | 1010 0111 0011 | — |
| | Error Occurrence Notification | 1010 0111 0100 | — |
| | Reception Verification Notification | 1010 0111 0101 | |
| | ... | ... | ... |
| Application Reception Verification from Higher-order LSI (Master/Target) | Reception Succeed | 1010 1001 0001 | Camera Zoom Indication Reception |
| | | 1010 1001 0010 | Camera Resolution Setting Reception |
| | ... | ... | ... |
| | Reception Error/Reject | 1010 1010 0001 | — |

The timing can be switched not only by the indication from the higher-order LSI of the master device but also by the timing change request from the target device to the master device. By sending the value of CTRL shown in Table 1 as the control signal of the timing change request from the target, it is possible to change timing of the transmission period, the reception period, and the IDLE period.

The difference between two processes is as follows. When the indication is made by the higher-order LSI, the contents is written into the CTRL register 40 from the higher-order LSI 11. On the other hand, when the target device makes the request, the code of the control signal (CTRL) of the timing change request from the target shown in Table 1 is used as the control signal transmitted in a process of data transmission tion described in (1) can be realized because the control signal can switch transmission and reception.

The control signal described in above table 1 at least has switch indication information of transmission and reception. This switch indication of transmission and reception can be notified by the first 4-bit (1010) of the control signal, for example. The device that detected this part performs switching process of transmission and reception. There is a possibility that 1010 bit in the data is incorrectly recognized as the control signal. However, malfunction can be avoided by setting not to use this sequence (1010) in the data. This setting can be made by 8B10B coding which is typically used.

Further, it is possible to include messages such as timing notification from the master to the target, timing change request from the target to the master, control indication and notification from the higher-order application, and reception verification, in the control signal. These messages can be transmitted in 8-bit which follows 4-bit indicating switch of transmission and reception. It is possible to use the control signal of only a switch indication with no message (1010 0000 0001) when there is no special message included.

The application control indication and notification is the control signal set in the CTRL register 40 from the higher-order LSI 11 of the master or the control signal set in the CTRL register 80 from the higher-order LSI 51 of the target. For example, the higher-order LSI 11 of the master can perform the camera zoom indication or the camera resolution setting on the target. On the other hand, the higher-order LSI 51 of the target can perform the camera status reporting and the like on the master. Further, it is possible to perform application reception verification both by the master and by the target. In the table 1, the control signal indicating reception success is transmitted as the control signal according to the indication of the higher-order LSI 51 of the target when the camera zoom indication or the camera resolution setting or the like is received.

In the present embodiment, it is possible to reduce unwanted transmission time in the two-way transmission system, thereby improving transfer efficiency. More specifically, the control signal is periodically transmitted for changing the target device from the receiving state to the transmitting state. Therefore, the target device can transmit the data and the master device receives the data. By employing application system of two-way transmission as described above, it is possible to transmit the control signal switching transfer direction from the process unit side. Then the camera which received the control signal switches the transmission and reception mode from reception to transmission. Therefore, the process unit gives the camera the transmission right, thereby making it possible for the camera which is the target to have the transmission right by itself. Then, it is possible to reduce unwanted transmission time and to improve transfer efficiency. It is not limited to the present embodiment but can be determined as appropriate which of the camera and the process unit is set to the master device or the target device.

It is also possible for the slave (target device) to obtain the transmission right. Therefore, both master and target can control the transfer direction. It is also possible to arbitrarily set or change transmission time by the slave to the master by the control signal.

Second Embodiment

Figure 6:
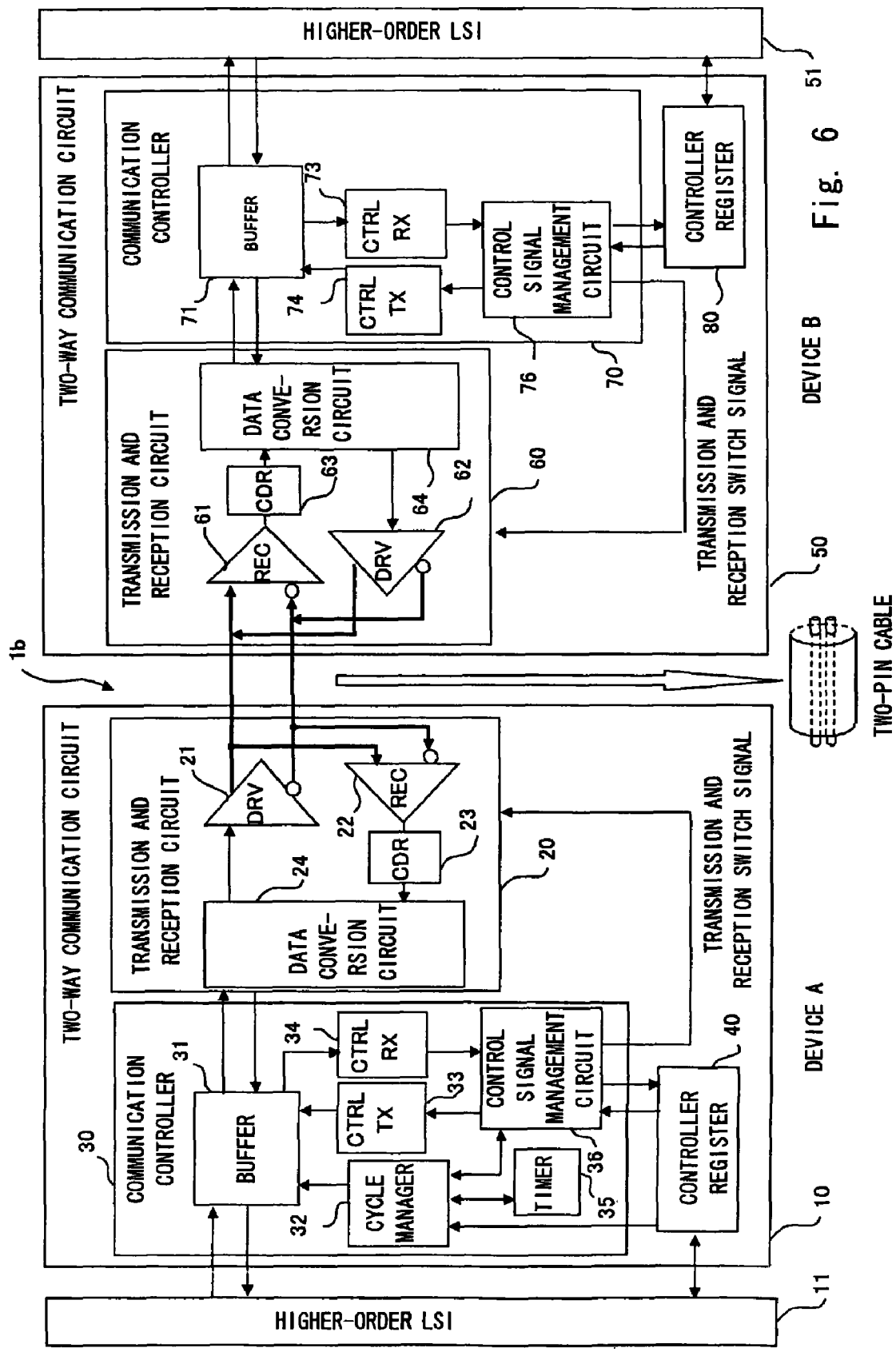
FIG. 6 is a diagram showing a transmission and reception system according to a second embodiment of the present invention.

FIG. 6 is a diagram showing a transmission and reception system 1b according to the second embodiment. In the second embodiment shown in FIG. 6 and a third embodiment shown in FIG. 7, the same reference numerals are given to the same components as in the transmission and reception system according to the first embodiment shown in FIG. 3 and detailed description will be omitted. In the second embodiment, the device B is the device dedicated for the target. When the device B is dedicated for the target, the cycle manager 72 and the timer 75 are not mounted because the device B does not need to manage the timing of transmission and reception by itself. The behavior of the second embodiment is the same to the behavior in the first embodiment except that the procedure for setting the master and the target can be omitted.

Third Embodiment

Figure 7:
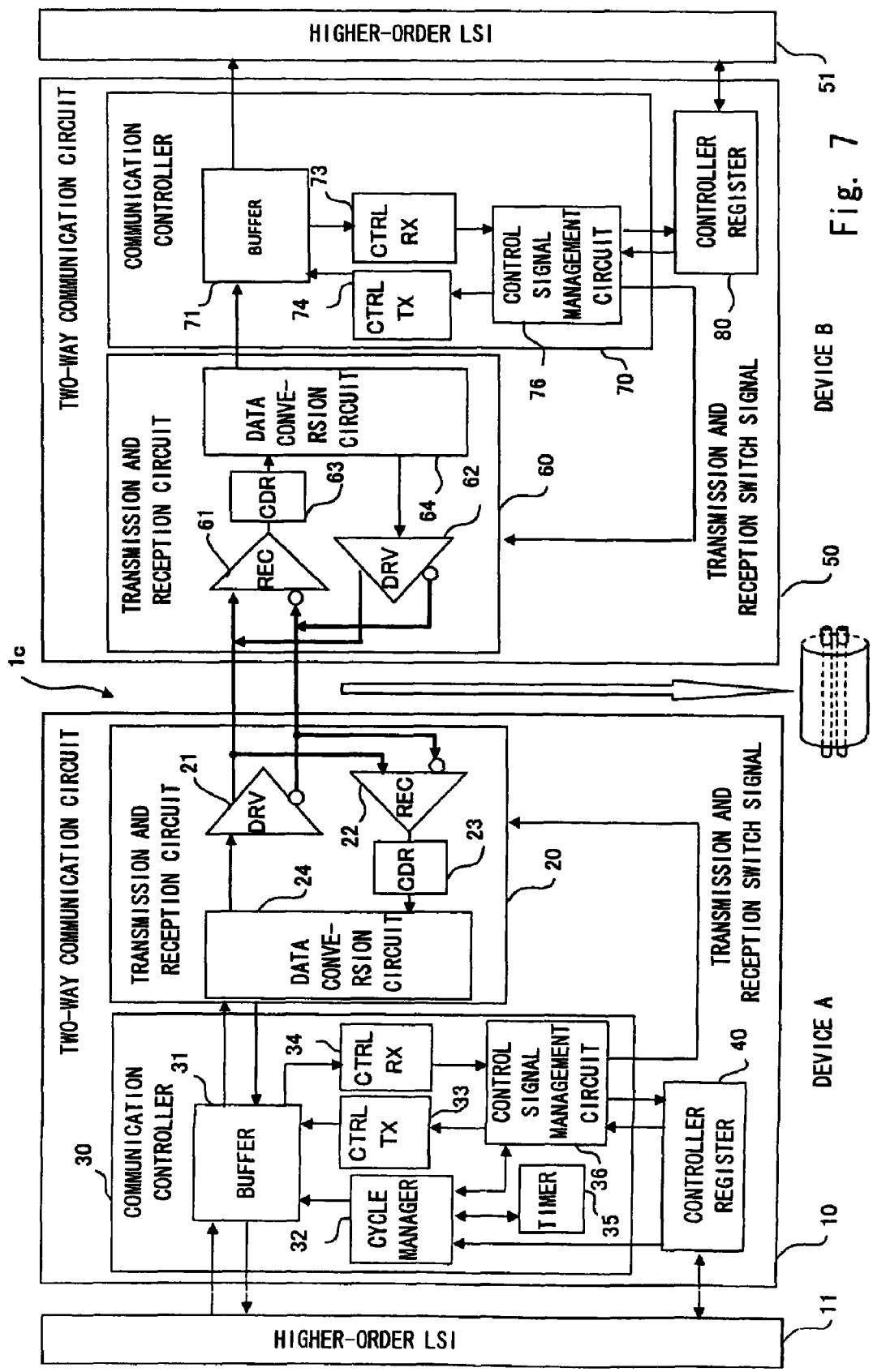
FIG. 7 is a diagram showing the transmission and reception system according to a third embodiment of the present invention.

Now, the third embodiment will be described. FIG. 7 is a diagram showing a transmission and reception system 1c according to the third embodiment. In the third embodiment, the data is transmitted only from the device A to the device B. The control signal is transmitted and received interactively. This is effective when the device B only needs to transmit short message, or only the control signal. The input and output of the buffer 31 and 71 are limited to one direction.

Figure 8:
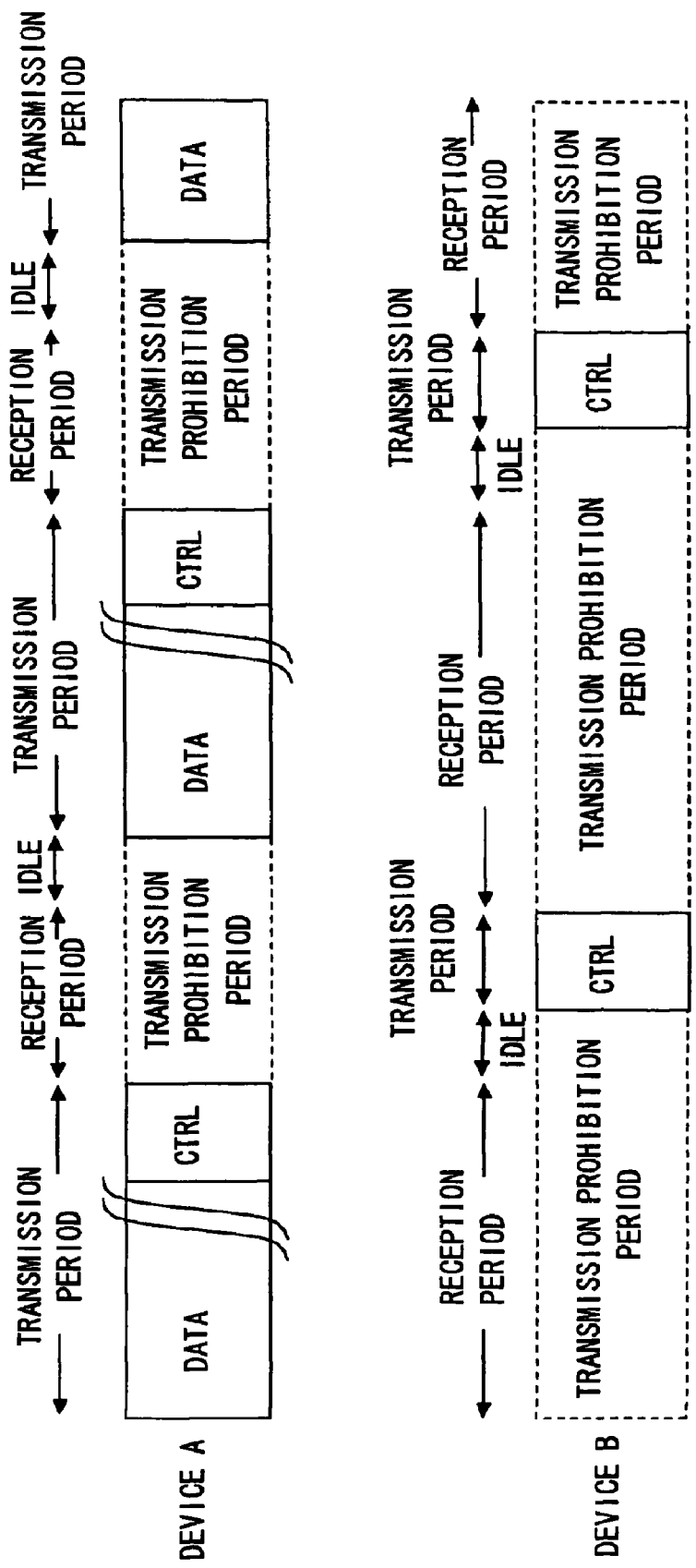
FIG. 8 shows a timing of transmission and reception of the two-way communication system according to the second embodiment of the present invention.

As shown in FIG. 8, the device B does not transmit data and only transmits the control signal. The whole switching process is the same as in the first embodiment except that the data is not transmitted from the device B.

Fourth Embodiment

Figure 9:
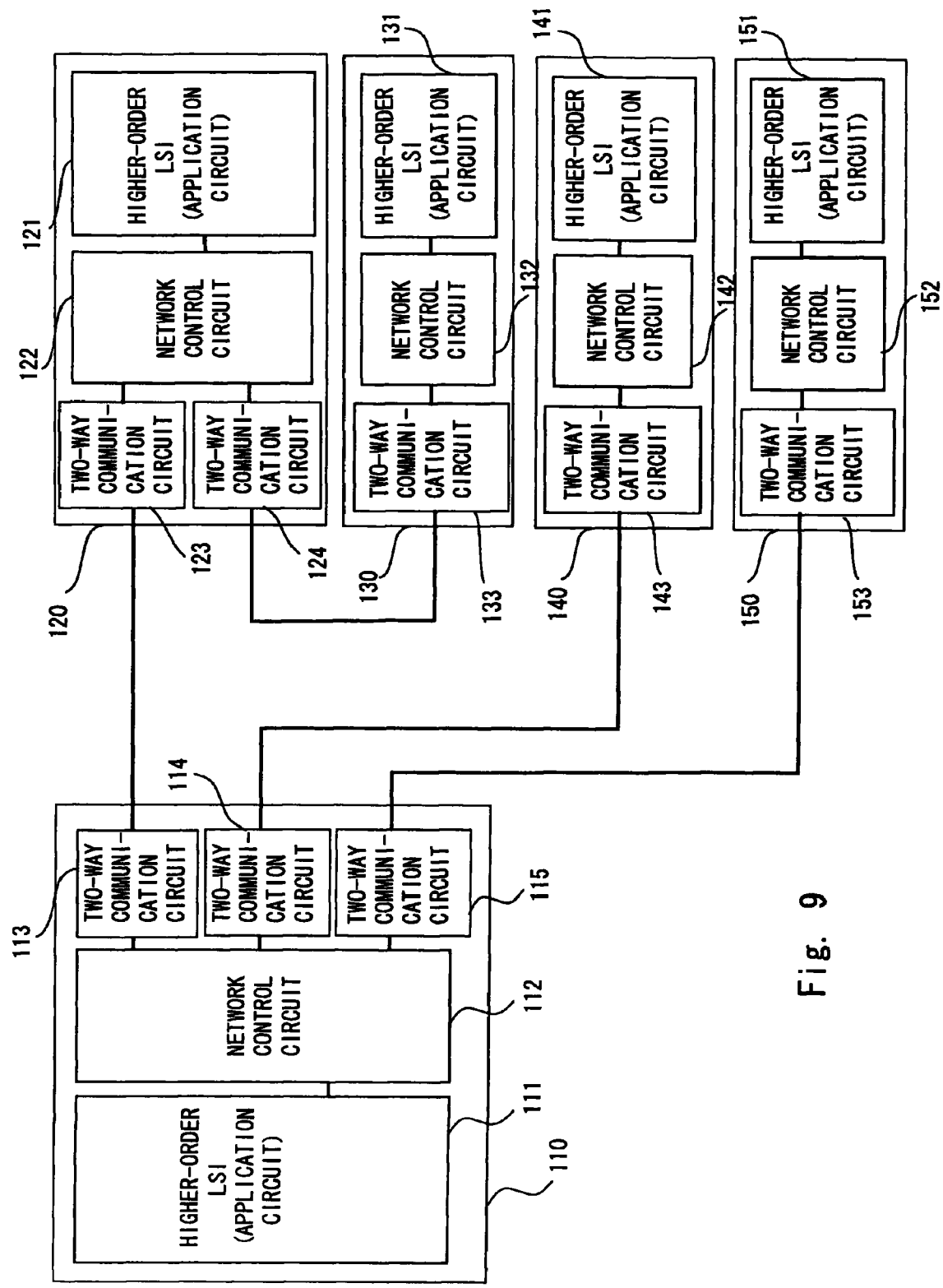
FIG. 9 is a diagram showing the transmission and reception system according to a fourth embodiment of the present invention.
Figure 10:
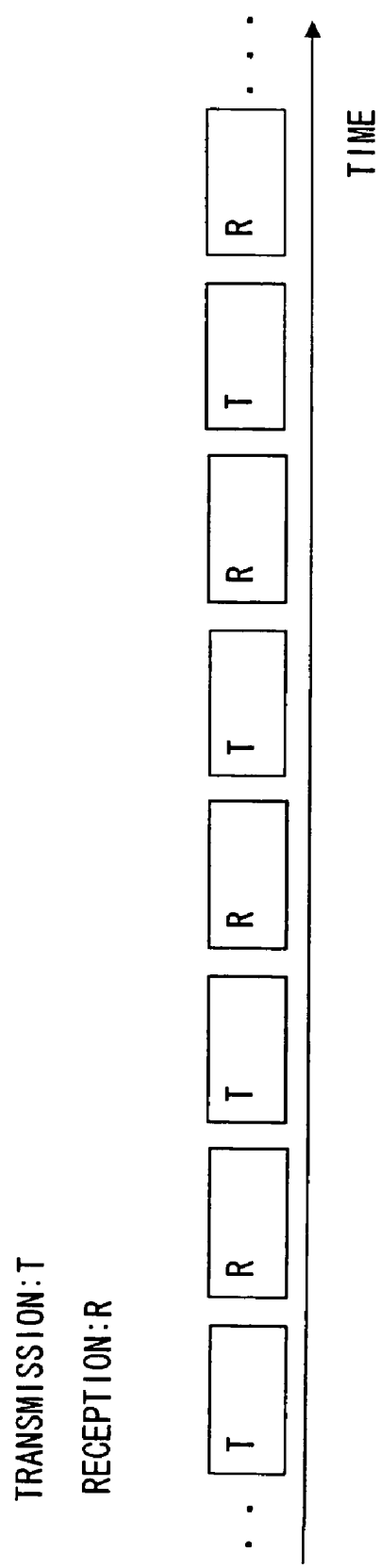
FIG. 10 is a diagram showing a typical ping-pong transmission.
Figure 11:
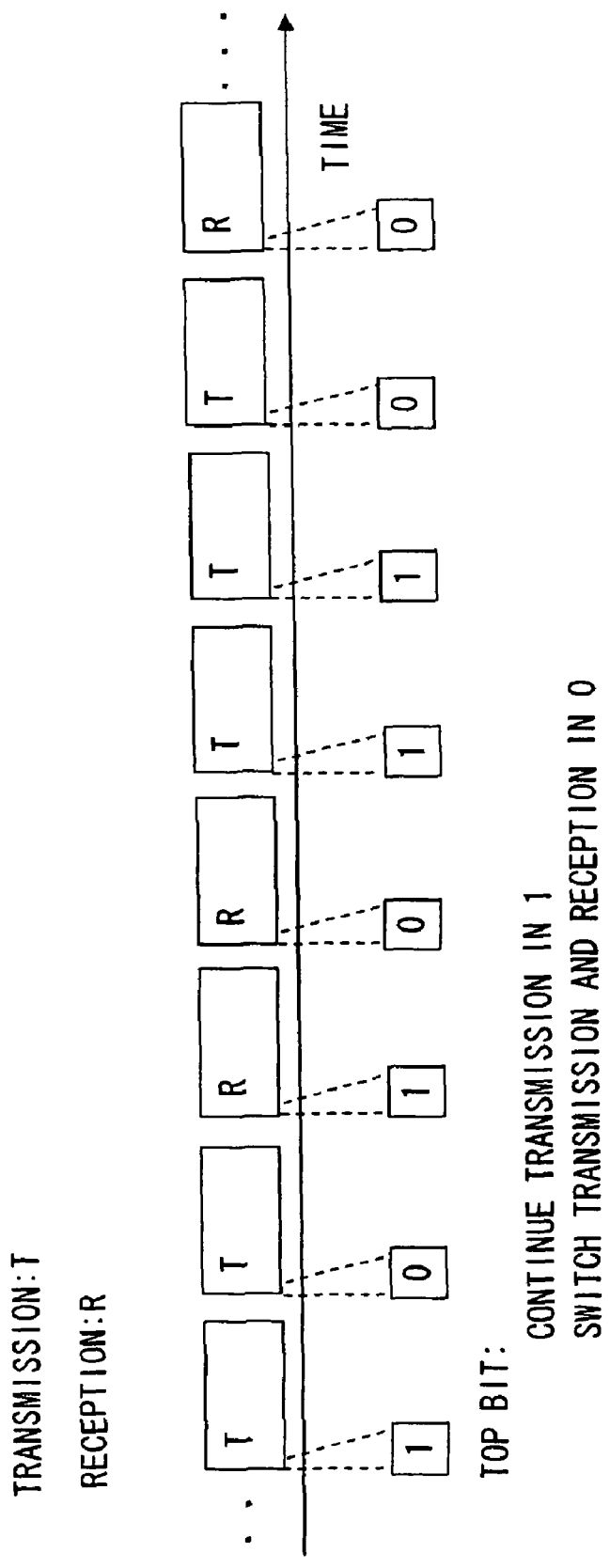
FIG. 11 is a diagram showing a data transfer method disclosed in Iinuma.
Figure 12:
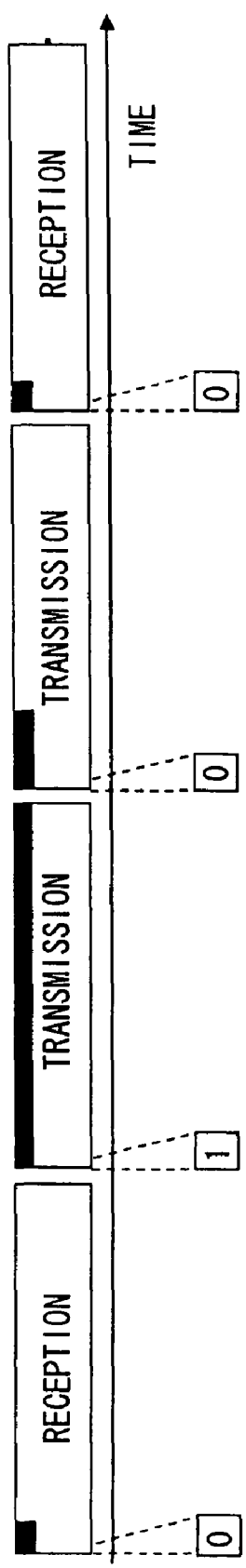
FIG. 12 is a diagram showing the data transfer method disclosed in Iinuma when transmission unit is large.
Figure 13:
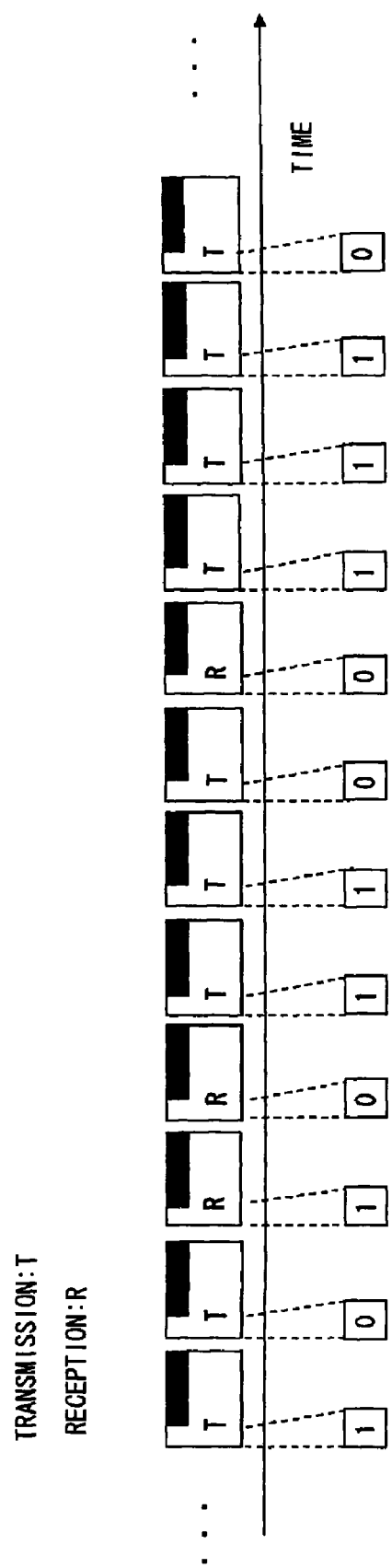
FIG. 13 is a diagram showing the data transfer method disclosed in Iinuma when transmission unit is small.

Now, the fourth embodiment will be described. FIG. 9 is a diagram showing the transmission and reception system according to the fourth embodiment. In the fourth embodiment, instead of performing one-to-one communication as in the first embodiment to the third embodiment, the communication is extended to network. In communication devices 110, 120, 130, 140, and 150, when network control circuits 112, 122, 132, 142, and 152 are inserted between the higher-order application circuits (higher-order LSI) 111, 121, 131, 141, and 151 and two-way communication circuits 113 to 115, 123, 124, 133, 143, and 153, respectively, networking is possible. In the present embodiment, as whole communication is managed in the two-way communication circuits 113 to 115, 123, 124, 133, 143, and 153, the network control circuits 112, 122, 132, 142, and 152 can be configured using typical bridge circuit as defined in IEEE 802.1.

By two-way communication is performed between the two-way communication circuits 113 and 123, 124 and 133, 114 and 143, and 115 and 153, one of these two-way communication circuits are master and the other ones are target. The master and the target can transfer transmission right by periodically transferring the control signal as stated above.

It is apparent that the present invention is not limited to the above embodiments, but may be modified and changed without departing from the scope and spirit of the invention.

What is claimed is:

1. A two-way communication circuit connected to one end of a cable performing a half-duplex communication, for transferring process data of a higher-order LSI, the two-way communication circuit comprising:
    a controller register that stores a control signal including switch indication information switching a transmission direction and a reception direction;
    a buffer circuit that stores the process data from the higher-order LSI and reception data from an opposing circuit device;
    a cycle management circuit that controls a timing of communication;
    a control signal management circuit that passes the control signal retrieved from the controller register according to a first timing designated by the cycle management circuit to the buffer circuit when the buffer circuit receives the process data, and that detects and retrieves the control signal from the reception data under a control of the cycle management circuit when the buffer circuit receives the reception data and provides the detected control signal to the controller register; and
    a transmission and reception circuit that includes receiver and driver circuits, and activates at least one of the receiver and driver circuits according to an indication by the control signal management circuit.

2. The two-way communication circuit according to claim 1,
wherein the control signal, which is detected by the control signal management circuit, includes a timing change request from the opposing circuit device, and
the cycle management circuit changes a timing of a transmission period and a reception period based on the change request of the control signal.

3. The two-way communication circuit according to claim 1,
wherein the opposing circuit comprises a target device.

4. The two-way communication circuit according to claim 1, wherein
the control signal includes a designation of a transmission period and a reception period, and
the cycle management circuit manages timing of each period based on the designation in the control signal.

5. The two-way communication circuit according to claim 2,
wherein the control signal includes a designation of a transmission period and a reception period, and
the cycle management circuit manages timing of each period based on the designation in the control signal.

6. The two-way communication circuit according to claim 3,
wherein the control signal includes a designation of a transmission period and a reception period, and
the cycle management circuit manages timing of each period based on the designation in the control signal.

7. The two-way communication circuit according to claim 4,
wherein the control signal includes a designation of an idle period where neither transmission nor reception is performed, and
the cycle management circuit manages a timing of the idle period based on the designation in the control signal.

8. The two-way communication circuit according to claim 1,
wherein the control signal includes a timing change request from a target device to a master device, and
the cycle management circuit changes a timing of a transmission period and a reception period based on the change request of the control signal.

9. The two-way communication circuit according to claim 2,
wherein the control signal includes a timing change request from a target device to a master device, and
the cycle management circuit changes a timing of a transmission period and a reception period based on the change request of the control signal.

10. The two-way communication circuit according to claim 1,
wherein the control signal manager periodically inputs the control signal to the transmission and reception circuit from the controller register or outputs the control signal from the transmission and reception circuit to the controller register based on a timing designated by the cycle manager.

11. The two-way communication circuit according to claim 2,
wherein the control signal manager periodically inputs the control signal to the transmission and reception circuit from the controller register or outputs the control signal from the transmission and reception circuit to the controller register based on a timing designated by the cycle manager.

12. The two-way communication circuit according to claim 1,
wherein the transmission and reception circuit includes a transmission circuit transmitting data, a reception circuit receiving data, and a data conversion circuit converting data from parallel to serial when the data is transmitted and converting data from serial to parallel when the data is received.

13. The two-way communication circuit according to claim 2,
wherein the transmission and reception circuit includes a transmission circuit transmitting data, a reception circuit receiving data, and a data conversion circuit converting data from parallel to serial when the data is transmitted and converting data from serial to parallel when the data is received.

14. A two-way communication system including two-way communication circuits, each being connected to respective ends of a cable performing half-duplex communication, wherein at least one of the two-way communication circuits comprises:
a controller register that stores a control signal received either from a higher level of the two-way communication circuit or from an opposing side two-way communication circuit, the control signal including a switch indication signal switching a transmission direction and a reception direction;
a buffer circuit that stores the process data from the higher-order LSI and reception data from an opposing circuit device;
a cycle management circuit that controls a timing of communication;
a control signal management circuit that passes the control signal retrieved from the controller register according to a first timing designated by the cycle management circuit to the buffer circuit when the buffer circuit receives the process data, and that detects and retrieves the control signal from the reception data under a control of the cycle management circuit when the buffer circuit receives the reception data and provides the detected control signal to the controller register; and
a transmission and reception circuit that includes receiver and driver circuits, and activates at least one of the receiver and driver circuits according to an indication by the control signal management circuit.

15. The two-way communication system according to claim 14, wherein the other two-way communication circuit includes:
a controller register storing the control signal including the switch indication information switching the transmission direction and the reception direction;
a transmission and reception circuit transmitting the control signal and receiving the control signal from the one two-way communication circuit; and
a communication controller controlling the transmission and reception circuit based on the control signal stored in the controller register.

16. The two-way communication system according to claim 14,
wherein the communication controller includes a buffer storing data or the control signal from a higher-order LSI and outputting the data or the control signal to the transmission and reception circuit.

17. The two-way communication system according to claim 16,
wherein the buffer outputs the data or the control signal input to the transmission and reception circuit to the higher-order LSI.

18. A communication method of a two-way communication circuit connected to one end of a cable performing half-duplex communication, the communication method periodically repeating, the method comprising:
receiving, in a buffer circuit of a transmission and reception circuit, a first control signal including switch indication information switching a transmission direction and a reception direction from a two-way communication circuit connected to the other end of the cable;
detecting that the first control signal has been received and registering the detected first control signal in a controller register;
after a predetermined timing after the registering in the controller register, switching the transmission and reception circuit to a transmission mode according to the first control signal;
transmitting, from the buffer circuit of the transmission and reception circuit, a second control signal including a switch indication signal switching the transmission direction and the reception direction by the transmission and reception circuit; and
switching the transmission and reception circuit to a reception mode after the second control signal is transmitted.

* * * * *